(12) United States Patent
Grimm (10) Patent No.: US 6,447,280 B1
(45) Date of Patent: Sep. 10, 2002

(54) DUAL MANIFOLD MOLD WITH ROTATING CENTER PLATE

(75) Inventor: Tod M. Grimm, Phoenix, AZ (US)

(73) Assignee: Tech Mold, Inc., Tempe, AZ (US)

( * ) Notice: Subject to any disclaimer, the term of this patent is extended or adjusted under 35 U.S.C. 154(b) by 47 days.

(21) Appl. No.: 09/675,480

(22) Filed: Sep. 29, 2000

(51) Int. Cl.[7] .............................................. B29C 45/16
(52) U.S. Cl. ..................... 425/116; 425/127; 425/129.1; 425/572; 425/576
(58) Field of Search ................................ 264/240, 243, 264/245, 255; 425/116, 127, 129.1, 572, 574, 575, 576

(56) References Cited

U.S. PATENT DOCUMENTS 5,256,048 A * 10/1993 Jacobs et al. ............... 264/243
5,609,890 A * 3/1997 Boucherie ................... 264/243
5,773,049 A * 6/1998 Kashiwa et al. ............. 264/255
6,139,305 A * 10/2000 Nesch ......................... 264/255

* cited by examiner

Primary Examiner—Tim Heitbrink
(74) Attorney, Agent, or Firm—LaValle D. Ptak (57) ABSTRACT

An injection mold for manufacturing two-component elongated members includes first and second mold cavity members mounted for relative movement toward and away from one another through an open central frame which carries a rotatable central mold plate in it. The central mold plate is configured to engage the parts of the first and second mold cavity members, which do not directly engage one another through the opening in the frame. When the mold is opened, the rotatable mold plate in the central frame member is rotated to place a pre-form on the opposite side of the mold for injection of a second component in the opposite side of the mold. The central frame moves one-half the distance between the first and second mold cavity members; and the rotatable mold plate is rotated 180° in each cycle.

13 Claims, 7 Drawing Sheets

DUAL MANIFOLD MOLD WITH ROTATING CENTER PLATE

BACKGROUND

Two-component injection molds are widely used to manufacture a variety of products. Typical of such products are screw caps for beverage cartons which have reclosable spouts consisting of a polyethylene boss and a polypropylene screw cap. The boss and cap are manufactured in a two-component, or two-shot, injection molding machine. In the first shot, the polyethylene boss is molded as a pre-form. This pre-form then is transferred to the finish injection station, where the second shot or injection of the polypropylene screw cap is made. The composite spout/screw cap then is ejected from the machine as a finished part.

In the past, the majority of two-component injection molding machines transfered the pre-form from the first to the second station for the over-molding by rotating a complete mold half (a rotary machine plate), or rotating part of the ejector-side mold half (indexing plate). In both cases, the pre-form and the finished part are on one parting line, side-by-side. A significant drawback of such a technique is that a large mold clamping area is required; and consequently, it is necessary to use large injection molding machines. Large machines are more costly than small machines, thereby increasing the cost of the finished product.

Two-component injection molding machines of the type described immediately above, while requiring relatively large machines for effecting the operation, still are reasonably practical for molding relatively small parts, such as beverage carton caps of the type described above. For products which have larger dimensions, however, such as toothbrushes which are several inches long, such conventional two-component injection molds require very large injection molding machines because of the relatively long longitudinal dimensions of the toothbrush handles. Several inches are required for each set (the pre-form side and the second shot side), as opposed to only one or two inches (for each part) for beverage carton caps, or the like.

In an effort to reduce the size of the injection molding machine required for two-component molded parts, a mold with a rotating center plate between a fixed plate and a movable plate has been devised. This mold is particularly useful for producing the two-component beverage carton caps described above. When the mold. is closed, the center plate is sandwiched or stacked between the other two plates. The pre-forms are formed between one side of the center plate and one of the other, generally conventional plates. The second shot or completion of the product then is formed between the other side of the center plate and the other one of the conventional plates. The mold then is opened; and the two-component finished products are ejected. The center plate is rotated to place the pre-form parts into position for injection of the second mold, and readying the mold for formation of the pre-forms on the side from which the finished products have been ejected. Each cycle of operation effects a 180° rotation of the center plate about its vertical center line (or a center line perpendicular to the movement of the other two plates toward and away from the center plate). The utilization of the rotating center plate, onto which the other two plates are closed and opened, permits the assembly to be placed in a smaller injection molding machine than would otherwise be required to produce the same number of parts in each cycle from a machine using a rotary machine plate or an indexing plate.

Even though the rotating center plate mold described above is an improvement over conventional two-shot molding machines, it still is impractical for use on elongated objects, such as toothbrushes and the like, for the reasons mentioned above in conjunction with the discussion about such products.

Therefore, it is desirable to provide a two-component injection mold for manufacturing two-component elongated products, which may be used with relatively small injection molding machines, and which employs a floating rotatable center plate mounted in a frame between a pair of reciprocating mold plates in which the rotatable mold plate is used to form only a portion of an elongated product to be produced by the mold.

SUMMARY OF THE INVENTION

It is an object of this invention to provide an improved two-component injection mold.

It is another object of this invention to provide an improved two-component injection mold using a rotating center plate.

It is an additional object of this invention to provide an improved two-component injection mold using a rotating center plate carried by a floating frame.

It is a further object of this invention to provide an improved two-component injection mold utilizing three mold plates, the central one of which rotates on an axis perpendicular to the opening and closing direction of movement of the mold plates; wherein the rotating mold plate is mounted in an open frame to permit passage of portions of the other mold plates on either side of the rotating plate.

In accordance with a preferred embodiment of this invention, an injection mold for manufacturing two-component elongated members includes first and second mold cavity members mounted for relative movement toward and away from one another in each cycle of operation, to close and open the mold, respectively. A central frame member, designed to overlie at least a portion of each of the first and second mold cavity members when the mold is closed, carries a rotatable mold plate located between a portion of each of the first and second mold cavity members for engagement thereby when the mold is closed. The rotatable mold plate is designed to rotate 180° for each closing and opening cycle of the first and second mold cavity members.

DETAILED DESCRIPTION

Figure 1:
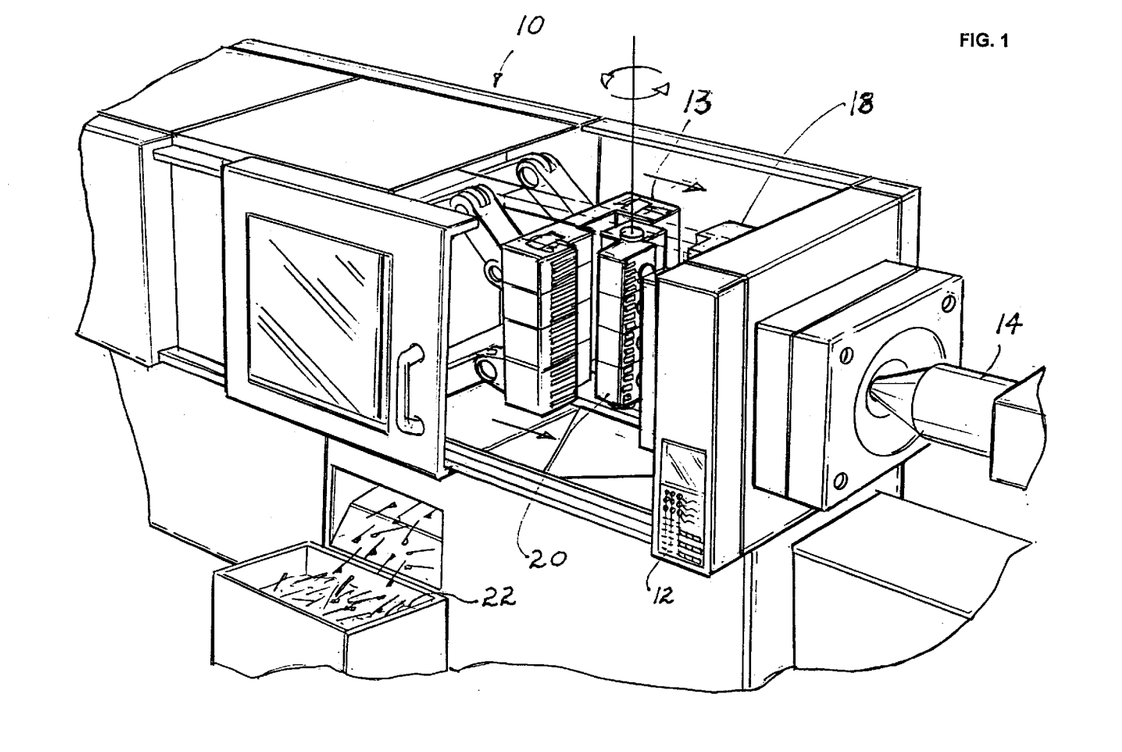
FIG. 1 is a perspective view of an injection molding machine diagrammatically illustrating the location of a preferred embodiment of the invention therein.

Reference now should be made to the drawings, in which the same reference numbers are used throughout the different figures to designate the same components. FIG. 1 shows a typical injection molding machine 10, with which the embodiment of this invention may be used. The injection molding machine 10 may be of any standard suitable configuration used for two-component molding of products. Such a machine typically includes a control panel 12 for controlling its operation. In addition, plastic material for injection into the mold cavities and the mold plates is supplied through a pair of injection rams (one for each of the two different components to be molded), one of which 14 is illustrated in FIG. 1.

Figure 2:
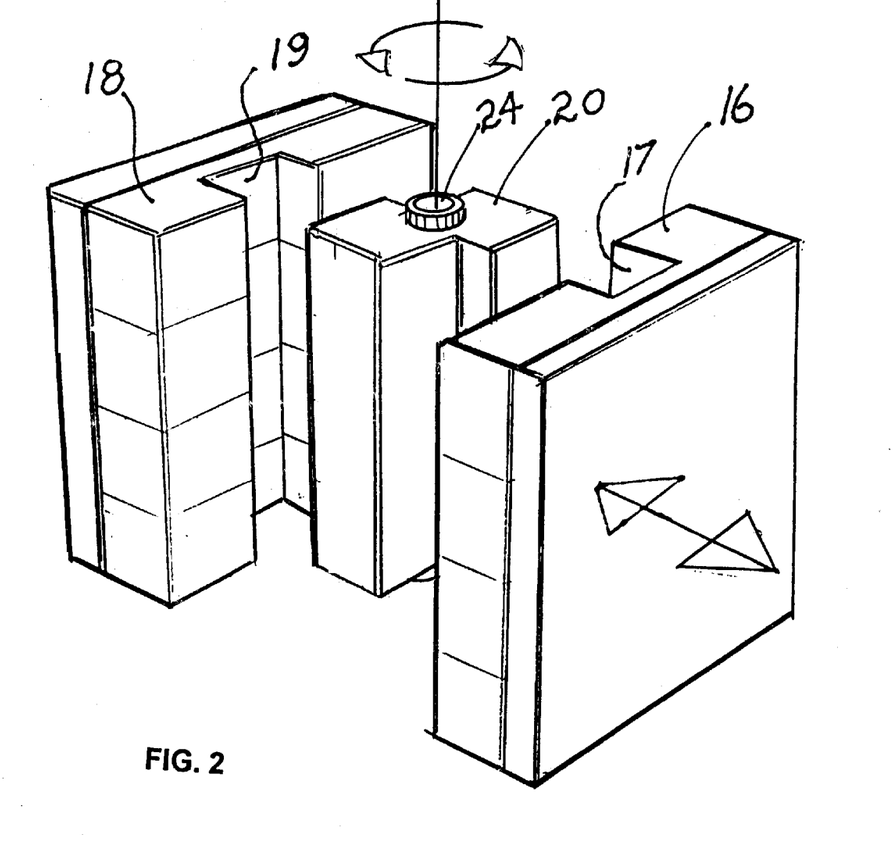
FIG. 2 is a diagrammatic perspective representation of the preferred embodiment of the invention.
Figure 3A:
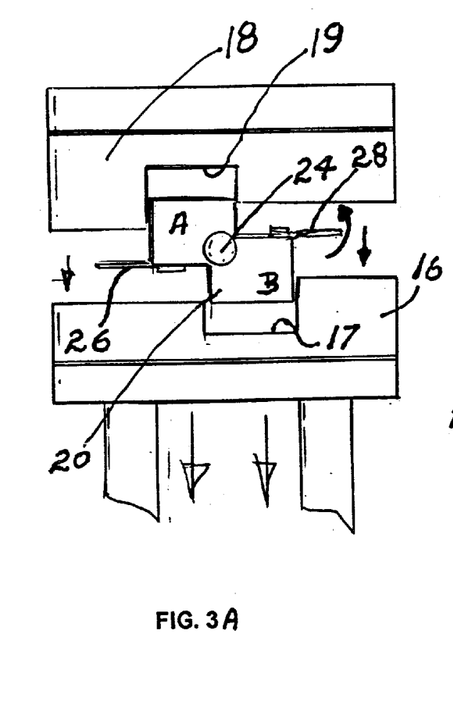
FIGS. 3A, 3B and 3C are diagrammatic representations of a cycle of operation of the preferred embodiment of the invention.
Figure 3B:
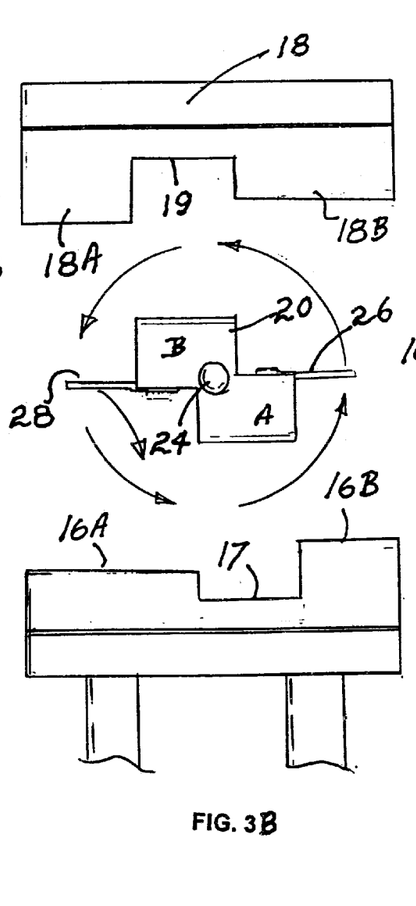
Figure 3C:
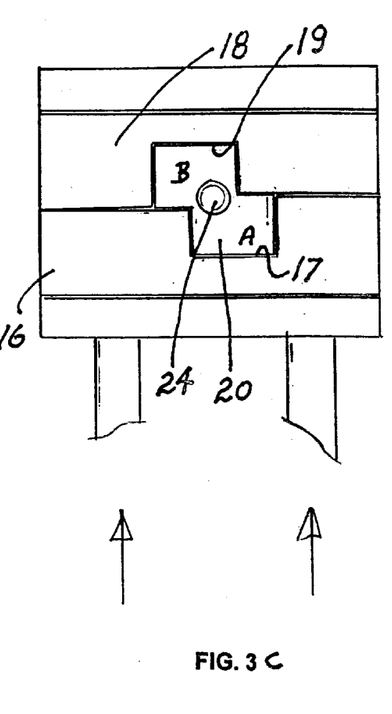
Figures 4, 5:
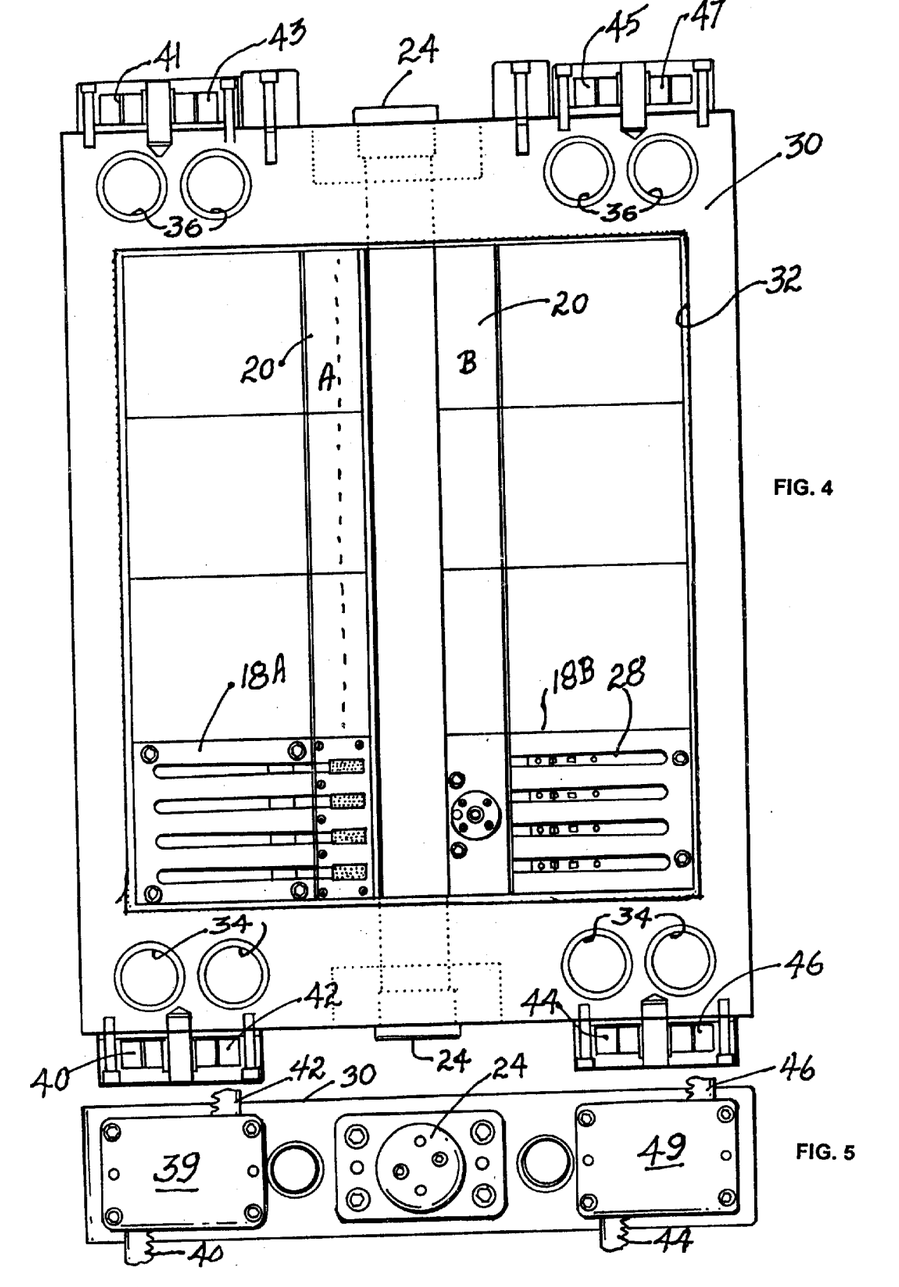
FIG. 4 is a detailed front view of a portion of the preferred embodiment of the invention.
FIG. 5 is a partial bottom view of a portion of the embodiment-shown in FIG. 4.
Figure 10:
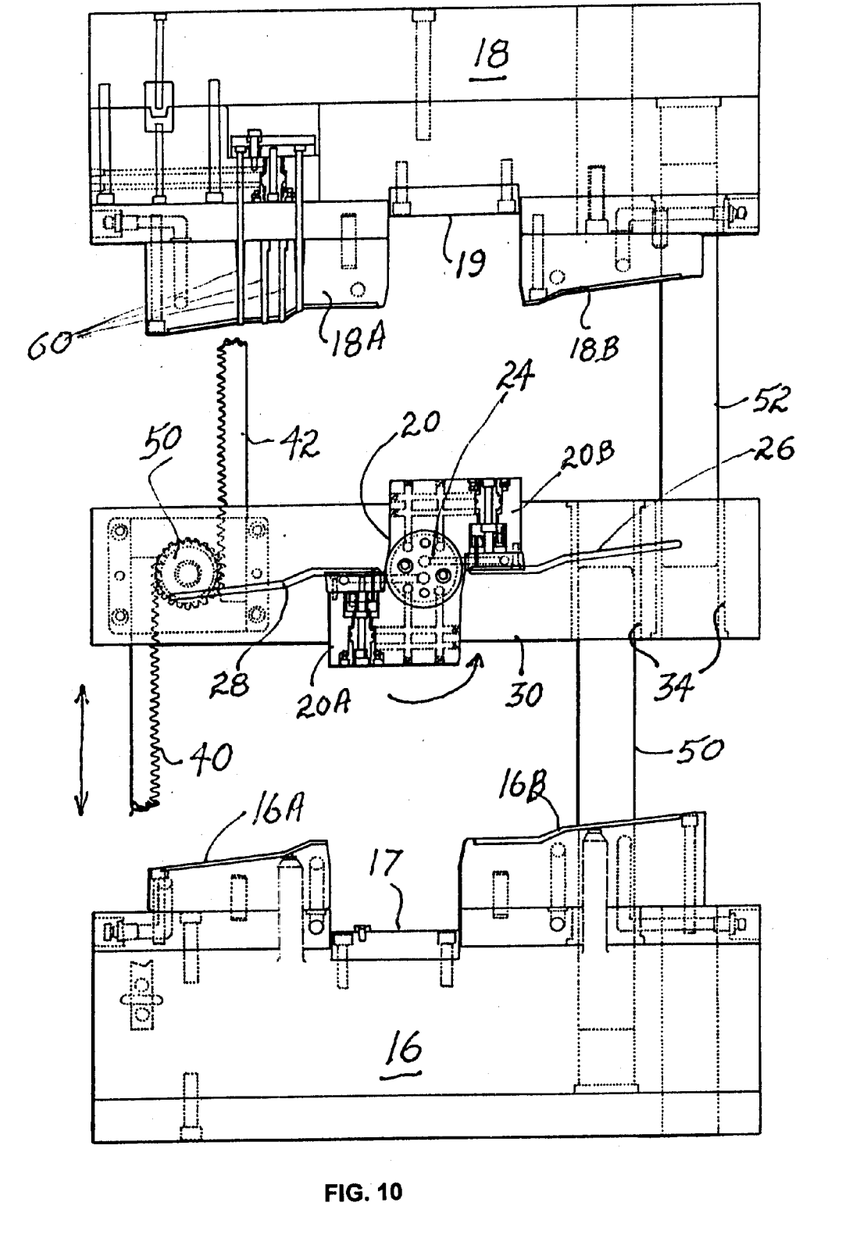
FIG. 10 is a top view of the preferred embodiment of the invention showing the mold in its open position.

In FIGS. 1, 2 and 3, the details of the standard mold blocks, including the manifolds, plastic delivery system, cooling lines and the like, have been removed to show a diagrammatic arrangement of the mold blocks or mold cavity blocks used in a preferred embodiment of the invention for molding toothbrush bodies. To accomplish this, a fixed mold block 18, carrying mold plates 18A and 18B for two separate manifold systems is provided. The mold plate 18A is injected with the first material for a toothbrush pre-form; whereas the second plate 18B includes a manifold for injection molding the second material to form a two-component toothbrush handle. FIGS. 4 and 10 illustrate these different plate portions 18A and 18B most clearly; although they are diagrammatically indicated in FIG. 3B also.

Figures 6, 7:
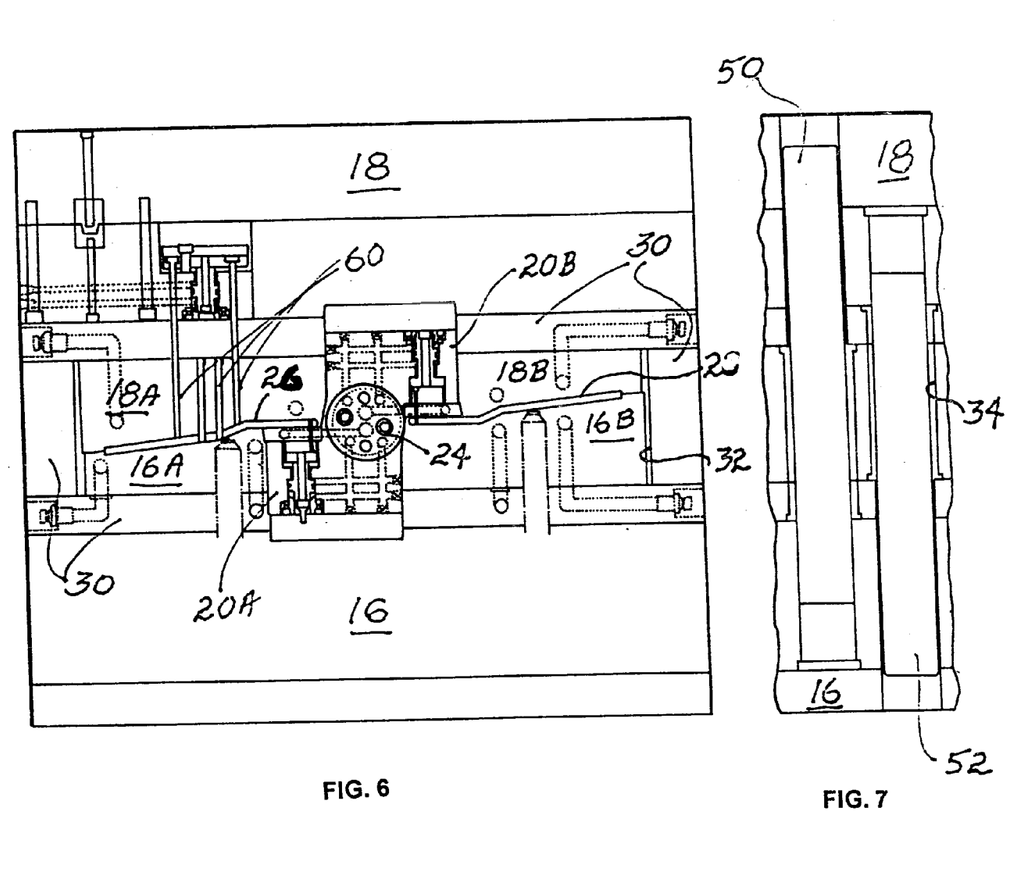
FIG. 6 is a top closed view of the preferred embodiment of the invention.
FIG. 7 is a bottom detailed view of a portion of the embodiment shown in FIGS. 4 and 6.
Figure 8:
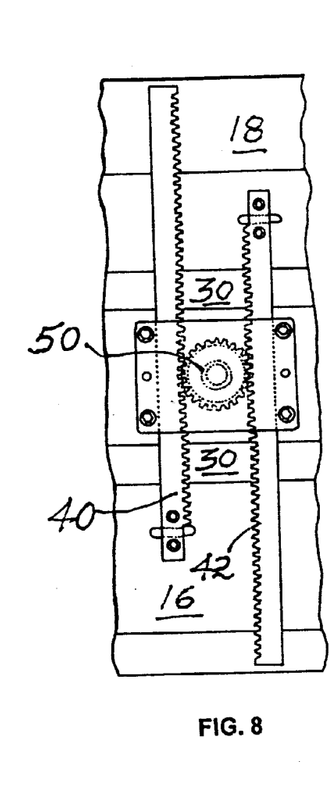
FIG. 8 is a bottom detailed view of another portion of the embodiment of the invention shown in FIGS. 4, 5 and 6.

In conjunction with the fixed mold block 18, there is a movable mold block 16, again mounted on conventional apparatus in an injection molding machine for movement toward and away from the mold block 18 to close and open the mold, respectively. The mold which is illustrated is a straight pull mold, which slides on four pairs of guide pins located, respectively, at the two lower corners and two upper corners of the mold assembly. Only one pair of these guide pins, 50 and 52, is illustrated in FIGS. 7 and 10 for purposes of clarity, since each pair is identical to the pair 50/52 which is illustrated. As is most apparent from FIG. 4, the guide pins extend through two pairs of lower guide pin holes 34 and two pairs of upper guide pin holes 36 formed through the various components of the mold blocks 16, 18 and a movable frame 30 for a central mold plate.

Before entering into a description of the detailed mechanism shown in FIGS. 4 through 10, a brief description of the overall operation of the preferred embodiment of the invention is considered in order. This description is made in conjunction with FIGS. 2, 3A, 3B and 3C, which diagrammatically illustrate the basic operating characteristics and general functional features of the preferred embodiment of the invention shown in detail in FIGS. 4 through 10. As shown in FIGS. 2 and 3, the mold for making toothbrush handles or other elongated bodies, includes a first mold block 18 having two sides or plates 18A and 18B (FIG. 3B). Opposing the mold block 18 is a movable mold block 16, which is designed to move horizontally in the mold machine of FIG. 1 in the direction of the double arrows, shown in FIG. 2 and the arrows shown in FIGS. 3A and 3C, to open and close the mold cavities formed between the plates 16A and 16B, which correspond and mate with the plates 18A and 18B, respectively. This is most apparent from an examination of FIGS. 3A to 3C.

In between the mold blocks 18 and 16 is a movable frame 30 (not shown in FIGS. 2 and 3), which carries a rotatable plate 20 designed for rotation about a vertical axis 24, as illustrated in FIGS. 2 and 3B. As is apparent from both FIGS. 2 and 3, the rotatable mold plate 20 has two offset sections "A" and "B", which are designed to fit into corresponding recesses 19 and 17 on the mold blocks 18 and 16, respectively. The portions A and B are identical in external configuration; so that either of them fits into either of the recesses 17 and 19, as most clearly shown in FIGS. 3A and 3C.

In the operation of the mold machine carrying the mold blocks 16, 18 and the frame 30 in which the rotatable plate 20 is mounted, the cycle originally commences with the mold closed and the segment A of the rotatable central plate nested into the recess 19 of the mold block 18 and the segment B of the rotatable central plate nested into the recess 17 of the mold block 16. The mold plate 18 extends beyond the segment 20A (in FIG. 3A) to abut directly against the corresponding mating portions of the mold plate 16A, in the manner of a standard two-plate straight pull mold. Similarly, portions of the mold plate 16B extend beyond the edge of the rotatable center plate 20B to engage the mating front of the mold plate 18B. This closed configuration is not shown in FIG. 3A, which illustrates the position of the various components just after the mold commences opening from the closed position described.

When the mold is first closed, the first component plastic material is injected into the first component mating cavities in the mold plates 16A and 18A and in mating cavities in the mold plates 16A and 20A (as illustrated in detail in FIG. 4 for the surfaces 18A and 20A). This injection of the first component material forms the pre-form 26 of the toothbrush handle and head. The mold then is opened, as illustrated in the initial stages in FIG. 3A. As the block 16 moves away from the fixed position block 18, the central floating frame 30 moves at half the rate to half the distance, to place the rotatable center plate 20A/B at a position midway between the two mold blocks 16 and 18 when the mold is fully opened. This is diagrammatically illustrated in FIG. 3B, and as illustrated in detail in FIG. 10.

Either upon fully reaching the position shown in FIGS. 3B and 10, or as the various components move from the closed position to the open position, the central rotatable plate 20 is rotated 180° in the direction of the arrows shown in FIGS. 3B and 10 to reverse the positions of the rotatable plate portions A and B, as shown in FIGS. 3A and 3B. At this time, the pre-form 26 is rotated to the position on the right; and (in all but the first cycle of operation), the finished two-component toothbrush handle 28 is rotated to the left-hand side of the mold, from the right, as illustrated in FIG. 3B. As indicated by the arrow attached to the toothbrush handle 28 in FIG. 3B, suitable mechanism is used to eject the finished toothbrush handle from this open mold position to prepare the mold for the next cycle of operation.

Consequently, when the mold once again closes as shown in FIG. 3C, a new pre-form 26 is formed on the left-hand side, while simultaneously, the second shot of plastic is applied through a manifold on the plate 18B to complete the molding of the second component around the pre-form handle 26. The mold then opens; and the cycle described above is repeated, with the simultaneous formation of pre-forms on the left-hand side of the mold plates shown in FIGS. 3A through 3C and formation of the finished product on the right-hand side of the mold plates, as shown in FIGS. 3A through 3C. In each cycle of operation, the central rotating plate 20 A/B rotates 180°; and upon completion of the rotation, the finished parts 28 are ejected prior to reclosure of the mold as shown in FIG. 3C.

It is important to note, even from the diagrammatic representation shown in 3B, that only the head portion (of a toothbrush handle) or a small percentage of the total length of the toothbrush handle body remains in a cavity in the rotatable plate 20. In actuality, only the portion of the toothbrush handle which subsequently has bristles inserted into it is the portion which is carried in the mold sections A and B of the rotatable central mold plate 20. The rest of the pre-form, as well as the finished handle, other than the head or bristle portion, extends beyond the central rotating plate 20A/B more than four to six inches across. The toothbrush handles extending substantially 180° outwardly from both sides of the plate 20 A/B may have an overall length of 14 or 15 inches. Thus, a relatively small mass for the rotatable plate 20 is required, compared to what would be required if the entire pre-form (and, therefore, finished product) needed to be carried in a cavity on the rotatable plate 20.

To accomplish the operation which has been outlined above in conjunction with the diagrammatic drawings of FIGS. 2 and 3, the mold shown in detail in FIGS. 4 through 10 has been designed. An important component of this mold is the mounting of the rotatable plate 20 in an open rectangular frame 30 (shown most clearly in the end view of FIG. 4). The plate 20 is pivotally mounted by means of a central pivot mechanism 24 extending from the top to the bottom of the opening 32 in the frame 30. The distance between the edges of the offset portions A and B of the rotatable plate 20 and the vertical edges or sides of the opening 32 in the frame 30 is selected to be great enough to permit the toothbrush handle extensions for the pre-form 26 and for the finished handles 28 to rotate within the frame 30.

The cavities in the mold plates 18A and 18B for the lowermost 25% of the plates 18A and 18B are shown through the open frame in FIG. 4 (as would be viewed from the movable mold block 16). The upper segments of the plates 18A and 18B are identical to the lowermost segment, but the details are not shown to avoid cluttering of the drawing.

It also can be seen from an examination of the cavities shown in the plate surface 20A and 18A, that the pre-form for the entire toothbrush, including the portion in which bristles are subsequently to be formed (in plate 20 of FIG. 4), forms a continuous cavity with respect to the mold plate surface 16A. The reverse side of the plate 20, showing the position where the second material is molded onto the pre-form, has no corresponding mold surface for the back or reverse side of the central mold plate portion 20B.

The offset mold plates 20A and 20B are identical. This is apparent from a consideration of FIGS. 2 and 3A, and the description provided previously.

The rotation of the central mold plate 20 on the shaft 24 may be controlled by means of an electrical servo-motor, hydraulics, or mechanical apparatus of any suitable type. Such mechanisms are well known, and for that reason, have not been shown in the drawings.

As mentioned previously, the sliding mold plate 16 and the central floating frame 30 are moved on pairs of guide pins, such as the guide pins 50 and 52, extending through the guide pin hole sets 34 and 36, shown most clearly in FIG. 4. FIG. 7 shows the location of the set of guide pins 50 and 52 when the mold is in its closed position; and FIG. 10 shows the position of those same guide pins with the mold in its open position.

Reference now should be made to FIG. 6, which shows the mold in its closed position. In this position, the pre-form 26 for a toothbrush handle is formed in the left-hand side of the closed mold; and the second component injection for the finished handle 28 is simultaneously formed on the right-hand side of the closed mold.

Portions of the top of the frame 30 and of the mold plates 16 and 18 have been removed to show the parting lines between the various components of the mold in its closed injection molding position. The vertical sides of the frame 30 are shown at each end of the apparatus of FIG. 6, where it can be seen that the mold plate surfaces 16A, 18A, 18B and 16B extend through the frame opening 32 beyond the rotatable plate 20A/20B to engage mating cavity sections on one another. Part of the plate 18A also engages the front surface of the facing mold plate 20A in the rotatable mold plate 20. The corresponding face of the face of the mold plate 16B engages the pre-form carried on the mold plate 20B (as illustrated in FIG. 6). Obviously for the next subsequent cycle of operation, the positions of the mold plates 20A and 20B will be 180° reversed. The plates 20A and 20B are identical, and the operation is identical for each cycle of operation.

By utilizing the open floating frame 30 in the manner described, a much simpler, smaller and less complex rotatable mold is possible than would be the case if the entire pre-form and the entire finished product had to be carried in cavities on the central rotating portion. As is readily apparent, especially in FIGS. 9 and 10, the toothbrush handle, both on the pre-form and on the finished product, extends well beyond the bristle portion, which is the only part carried on the faces 20A and 20B of the central rotatable plate 20.

When the mold is in the position shown in FIG. 6, injection of the pre-form plastic is supplied through runners 60 of the plate 18A to form the pre-form 26 in cavities in the face of the movable mold plate 16A and the face of the rotatable mold plate 20A. Simultaneously, the second plastic component (which may be a different material, or a material of a different color) is injected through runners similar to the runners 16 of the plate 18B to form the finished two-component handle 28. Again, for purposes of clarity, these runners for injecting the second plastic component are not shown in the drawing, since the manner in which this is done is conventional. It also should be noted that the various cooling channels and the apparatus for supplying cooling fluid through the channels is not described, since the techniques for doing this are conventional and do not form a part of this invention.

After formation of the pre-form 26 on the left-hand side as shown in FIG. 6, and of the finished two-component handle 28 on the right-hand side of FIG. 6, the mold is opened to the position shown in FIG. 10. Different techniques can be used to ensure that the central floating plate or frame 30 is located exactly in the center between the plates 16 and 18. A technique, however, which is considered quite effective is to use a pair of racks 40 and 42 attached to the plates 16 and 18, as shown most clearly in FIG. 8, to operate on a gear set 50 placed in a housing 39 on the bottom of the frame 30, as shown in FIGS. 4, 5, 8 and 10. These racks 40 and 42 rotate a freely pivoted gear 50 mounted on the frame 30 such that for each inch of movement of the plate 16 toward and away from the plate 18, the frame 30 moves in the corresponding direction one-half inch. This type of mechanism is well known, and is suitable for the operation of the mold system of a preferred embodiment of this invention.

Ideally, although only one rack and gear set 40, 42, 50 has been illustrated in detail in the drawings, four such rack and gear sets are provided to ensure accurate positioning. The four sets are located at the lower corners and the upper corners of the frame 30 and are illustrated in FIG. 4, and two of them are illustrated in FIG. 5. The rack sets include the set 40/42 just described and a mating set 44/46 located in a housing 49 on the opposite side of the bottom of the center frame member 30. Corresponding sets on the upper ends (or corners, as viewed in FIG. 4) of the floating frame 30 include racks 41, 43, and 45, 47. All of these racks operate on gears similar to the gear 50 attached for free rotation on the frame 30. By utilizing four sets of identical racks, twisting or rocking of the frame 30 during the cycle of operation of the machine is reduced to a minimum.

Figure 9:
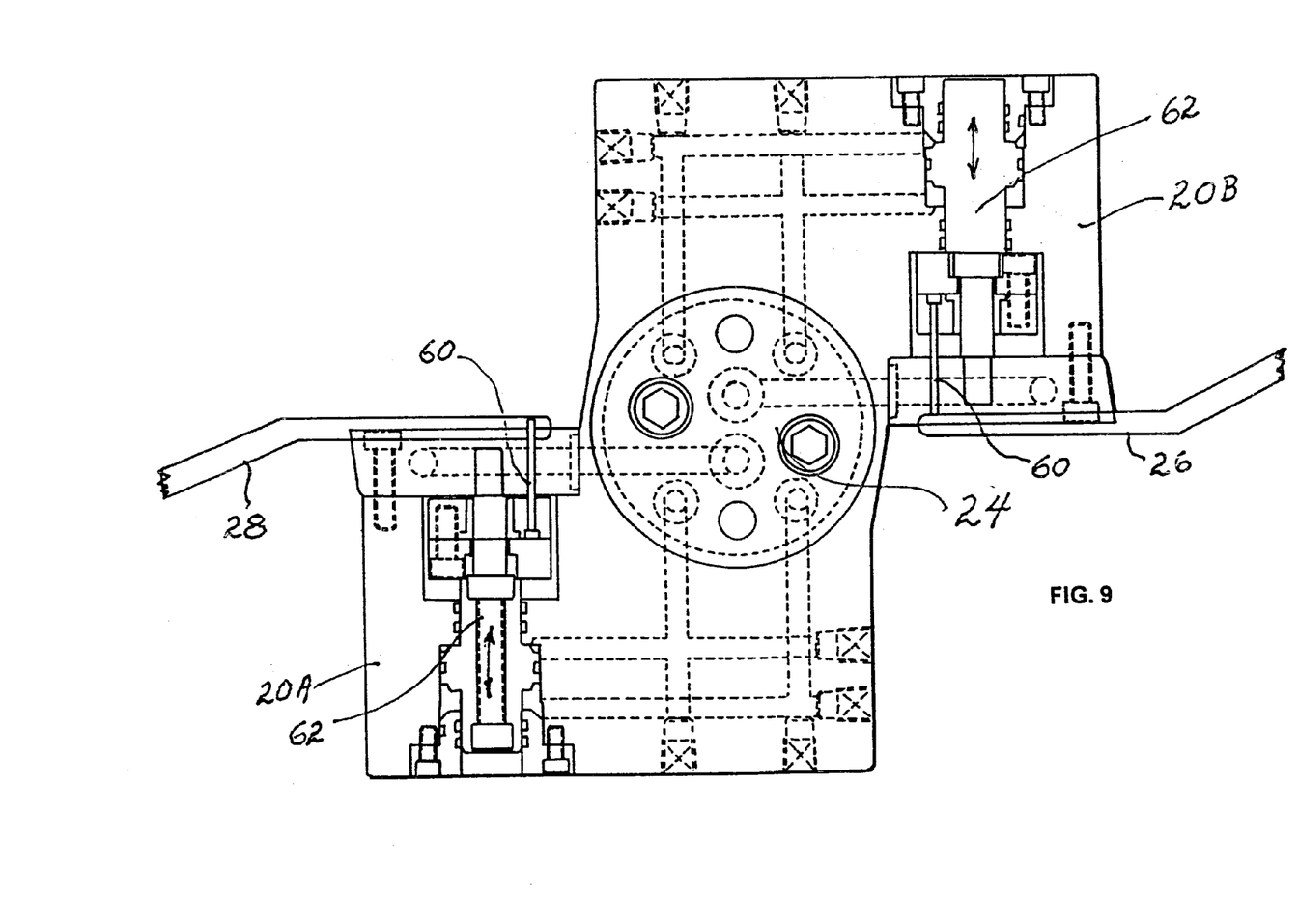
FIG. 9 is a detail of the central portion of the embodiment shown in FIGS. 6 and 10.

Reference now should be made to the enlarged view of FIG. 9, which shows the central rotating plate 20 with the two sections 20A and 20B illustrated. When the plate rotates, at the end of a full two-step operating cycle, to present the finished two-component toothbrush handle 28 to the position shown on the left-hand side in. FIG. 9, a piston 62 is operated to move downwardly (as viewed in FIG. 9) to withdraw a plurality of pins 60 (only one of which is shown, to avoid cluttering the drawing) from the bristle holes in the head of the toothbrush handle 28. The pins 60 hold the pre-form 26 in place as the central rotatable plate 20 is rotated 180° in the operation of the machine as described previously. Withdrawal of the pins from the handle 28 by the piston 62 effects release of the handle 28, which then drops from the machine as diagrammatically indicated in FIG. 1. The handles 28 then are supplied either to a bin, such as the bin 22 of FIG. 1, or to a conveyor for subsequent operation by a bristle inserting machine. Because a relatively large number of pins 60 extend into the pre-form 26 (and also into the finished two-component handle 28), the pre-form 26 is held firmly in place during rotation of the central rotating plate 20; so that alignment of the plastic pre-form 26 with corresponding cavities in the faces 18B and 16B of the reciprocating mold plates is ensured for the second shot, as described.

The foregoing description of the preferred embodiment of the invention is to be considered as illustrative and not as limiting. Various changes and modifications may be made to perform substantially the same function, in substantially the same way, to achieve substantially the same result by those skilled in the art, without departing from the true scope of the invention as defined in the appended claims.

What is claimed is:

1. An injection mold for manufacturing two-component elongated members including in combination:

first and second mold cavity members mounted for relative movement toward and away from one another in each cycle of operation to close and open the mold, respectively, and a central frame member in the form of an open rectangular frame, with a top, a bottom, and first and second sides interconnecting the top and the bottom, and through which at least a portion of each of the first and second mold cavity members extend to engage one another when the mold is closed;

a rotatable mold plate rotatably mounted on a central pivot located between the top and bottom of the frame member, wherein the rotatable mold plate has transverse dimensions across it between the first and second sides of the frame member which are substantially less than the distance across the opening between the first and second sides of the frame member; and wherein the rotatable mold plate is located between a portion of each of the first and second mold cavity members for engagement thereby when the mold is closed.

2. The injection mold according to claim 1 wherein the rotatable mold plate rotates about an axis perpendicular to the relative direction of movement of the first and second mold cavity members toward and away from one another.

3. The injection mold according to claim 2 wherein portions of the first and second mold cavity members extend past the rotatable mold plate to directly engage one another through the opening in the frame member on each side of the rotatable mold plate when the mold is closed.

4. The injection mold according to claim 3 wherein the rotatable mold plate has first and second faces and is rotated 180° in the central frame member each time the first and second mold cavity members are moved away from one another a predetermined maximum distance, whereupon each successive closure of the mold by movement of the first and second cavity members toward one another causes alternate ones of the first and second faces of the rotatable mold plate to engage corresponding portions of the first and second mold cavity members.

5. The injection mold according to claim 4 wherein the elongated members are toothbrushes with a head portion and a handle portion, and wherein a first component of the two-component toothbrush is used to form the head in a cavity in the first mold cavity member and a corresponding cavity in the rotatable mold plate, and to form a first component of the handle in mating cavities between first portions of the first and second mold cavity members extending through the central frame member, whereupon opening of the mold by relative movement of the first and second mold cavity members away from one another causes the central frame member also to be located one-half the distance between the first and second mold cavity members while rotating the rotatable mold plate with the toothbrush head attached thereto 180° prior to the next cycle of closure of the mold.

6. The injection mold according to claim 5 wherein the second component of the two-component elongated toothbrush is formed between second portions of the first and second mold cavity and the first component of the handle of the toothbrush carried by the rotatable mold plate in the central frame member.

7. The injection mold according to claim 6 further including mechanism for ejecting finished two-component toothbrushes from the rotatable mold plate when the first and second mold cavity members are moved away from one another.

8. The injection mold according to claim 1 wherein the elongated members are toothbrushes with a head portion and a handle portion, and wherein a first component of the two-component toothbrush is used to form the head in a cavity in the first mold cavity member and a corresponding cavity in the rotatable mold plate, and to form a first component of the handle in mating cavities between first portions of the first and second mold cavity members extending through the central frame member, whereupon opening of the mold by relative movement of the first and second mold cavity members away from one another causes the central frame member also to be located one-half the distance between the first and second mold cavity members while rotating the rotatable mold plate with the toothbrush head attached thereto 180° prior to the next cycle of closure of the mold.

9. The injection mold according to claim 8 wherein the second component of the two-component elongated toothbrush is formed between second portions of the first and second mold cavity and the first component of the handle of the toothbrush carried by the rotatable mold plate in the central frame member.

10. The injection mold according to claim 9 further including mechanism for ejecting finished two-component toothbrushes from the rotatable mold plate when the first and second mold cavity members are moved away from one another.

11. The injection mold according to claim 1 wherein portions of the first and second mold cavity members extend past the rotatable mold plate to directly engage one another through the opening in the frame member on each side of the rotatable mold plate when the mold is closed.

12. The injection mold according to claim 1 wherein the rotatable mold plate has first and second faces and is rotated 180° in the central frame member each time the first and second mold cavity members are moved away from one another a predetermined maximum distance, whereupon each successive closure of the mold by movement of the first and second cavity members toward one another causes alternate ones of the first and second faces of the rotatable mold plate to engage corresponding portions of the first and second mold cavity members.

13. The injection mold according to claim 12 wherein portions of the first and second mold cavity members extend past the rotatable mold plate to directly engage one another through the opening in the frame member on each side of the rotatable mold plate when the mold is closed.

* * * * *